Dec. 27, 1949     S. M. LEVINE     2,492,806
POULTRY WATERING SYSTEM
Filed April 24, 1948     2 Sheets-Sheet 1
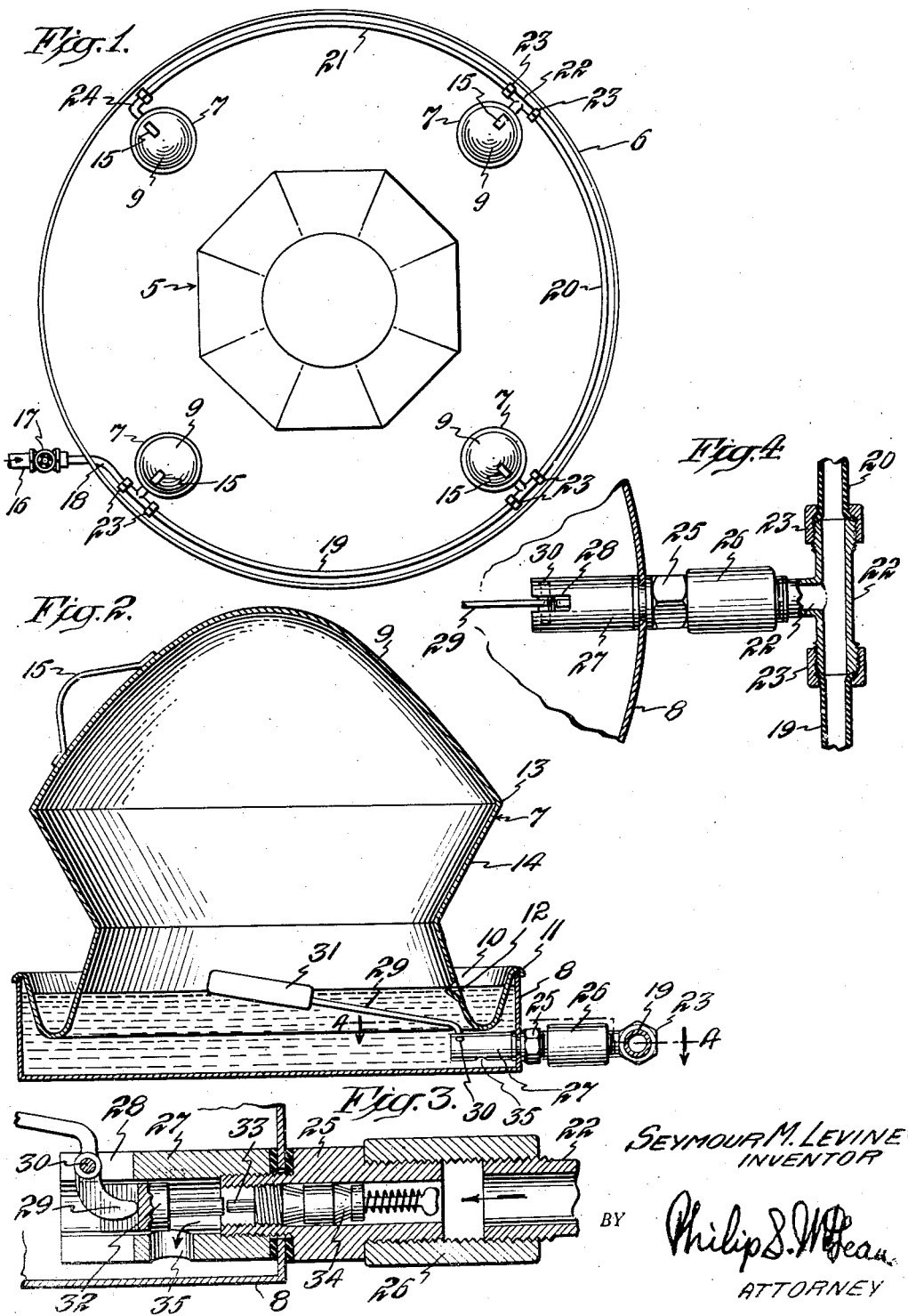
Seymour M. Levine
INVENTOR
BY Philip S. ~~~~
ATTORNEY

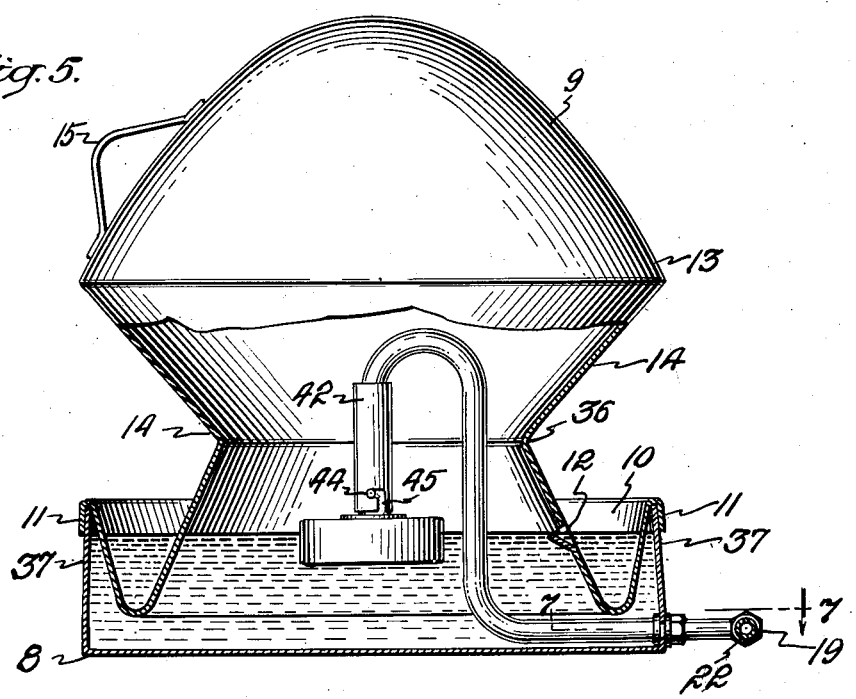
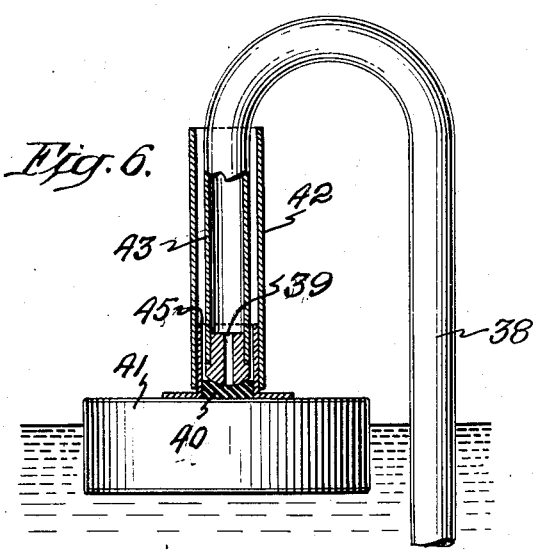
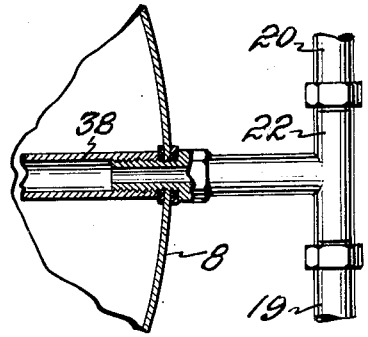

Patented Dec. 27, 1949

2,492,806

UNITED STATES PATENT OFFICE 2,492,806

POULTRY WATERING SYSTEM

Seymour M. Levine, Freehold, N. J.

Application April 24, 1948, Serial No. 23,089

1 Claim. (Cl. 119—80)

The invention herein disclosed relates to the watering of poultry and particularly to the supplying of drinking water to small size "chicks" in the brooder stage of development.

Special objects of the invention are to provide an automatic, continuous supply of fresh drinking water to one or a number of fountains associated with the brooder, to protect the water supplied against contamination and to enable quick and easy cleaning of the fountains.

Further special objects of the invention are to furnish the drinking water in ample supply but in a form which will guard the chicks against drowning and prevent contamination.

Further special objects of the invention are to provide a continuous automatic water supply system which may be readily built up or extended to any required demand or be contracted or taken down for storage or the like.

Other desirable objects and the novel features through which all purposes of the invention are attained are set forth or will appear in the course of the following specification.

The drawings accompanying and forming part of the specification illustrate present practical embodiments of the invention. Structure, however, may be modified and changed as regards the immediate illustration, all within the true intent and broad scope of the invention as hereinafter defined and claimed.

Fig. 1 in the drawings is a broken plan view of a brooder installation having the invention incorporated therein in the form of four continuously supplied fountains;

Fig. 2 is an enlarged vertical sectional view of one of the fountains;

Fig. 3 is a further enlarged broken sectional detail view of the float valve water supply control;

Fig. 4 is a broken and horizontal sectional view of the valve and supply connections appearing as on substantially the plane of line 4—4 of Fig. 2;

Fig. 5 is a broken sectional view of a modified form of the fountain;

Fig. 6 is an enlarged broken sectional detail of the direct acting float valve;

Fig. 7 is a broken sectional view on substantially the line 7—7 of Fig. 5.

In Fig. 1 a brooder stove is indicated in plan at 5 surrounded by a ring 6 providing a pen for confining the chicks.

During this brooder stage the chicks, for best development, require continuous, ample supply of fresh drinking water at room temperature.

The invention assures these requirements by a series of fountains indicated at 7 in Fig. 1, in the brooder pen in closely adjoining relation about the brooder stove and carrying conveniently accessible, continuously fresh supplies of tempered water.

These fountains, in the present illustrated embodiment, Fig. 2, are each made up of a shallow, flat, circular pan 8 connected with an automatically furnished water supply and a dome-shaped cover 9 having a narrow U-shaped or V-shaped gutter or trough 10 about the rim of the same and dipping into the body of the pen, this trough structure having a downwardly directed flange 11 about the outer edge of the same fitting over the annular wall of the pan.

The trough portion 10 has one or more openings 12 therein to provide communication between the pan and the trough and determine the proper level of drinking water exposed in the trough.

The top of the cover is shown domed in the form of an arch, spreading out to a maximum diameter at 13 approximating the outer diameter of the trough and sloped to shed litter that may be scratched up by the chicks.

Immediately below the sloping eaves portion 13 the cover is shown as sloped inwardly at 14 to provide space for the heads of the chicks over the trough, but this inward slope preferably is insufficient to admit bodily movement of the chicks into the trough.

Thus the domed shaped cover, in addition to providing an enclosure for the water within the pan, serves to keep the chicks out of the gutter and to guard the trough against litter or trash which is naturally thrown up in the brooder pen.

To enable quick and easy handing, the cover is shown provided with a grip or handle 15 on the top and at one side of the dome, which may be gripped in the fingers of one hand to lift the cover off the pan and to tilt it to dump any water and foreign matter in the trough. It will be noted that the deflecting roof portion 13 of the cover is located high enough above the trough both to admit the heads of the chicks for drinking and to be clear of the trough for quick dumping of the contents.

The automatic water supply portion of the system comprises, in the illustration, a float controlled valve in each pan and readily connectable and disconnectable flexible hose or tubing between the different fountains.

Specifically, there is shown a water supply pipe 16 with a pressure reducing or volume controlling and shut-off valve 17. From this valve there is extended a flexible line of tubing 18 to the first fountain and intermediate flexible tubing 19, 20, 21, to the successive fountains.

Fig. 4 shows how these successive connections may be provided by T couplings 22 with which the hose or tube connections may be connected by detachable flange couplings 23. At the last or outermost fountain an L coupling 24 may be used instead of a T coupling.

The float valve structure may be of the tire inflating type as indicated at 25 in Fig. 3, clamped in water-tight relation in the annular wall of the pan and connected by a screw coupling 26 with the T or L couplings 22, 23.

In the illustration a sleeve 27 is shown screwed over the inner end of the tire valve body, inside the pan, slotted at the inner end at 28 for accommodation of the valve opening lever 29 pivoted therein at 30 and connected with the float 31.

The inner end of the float lever is shown as engaging a plunger 32 positioned to actuate the stem 33 of the valve 34 which when opened, admits liquid down through the opening 35 in sleeve 27 into the bottom of the pan. This sleeve, as shown in Fig. 2, is low enough in the pan to be clear of the bottom of the trough and is long enough to support the pivot 30 of the float inwardly clear of the trough. The float valve mechanism, therefore, is clear of the removable cover and is not affected by and does not affect the ready removal and replacement of the cover.

The invention, it will be apparent, provides a plentiful, continuous, clean supply of drinking water in a safe form for small chicks and at approximately room temperature, since the incoming water is admitted into the bottom of the pan and under normal conditions will be maintained in the pan long enough to take up room temperature.

The fountains can be quickly set up or taken down, either singly or any number in a series, as needed to meet immediate requirements.

The fountains are quickly cleaned by simply lifting off the covers and turning out contents of the trough. The water within the pans is kept covered and clean to provide a continuous sanitary supply. The automatic operation of the fountains is simple, safe and infallible. The pans will not run over when the covers are removed and thus objectionable wet floor conditions are avoided.

The continuous automatic supply of the drinking water provides a clean source for medication, if that be required.

In Fig. 5 the dome-shaped cover 9 is modified to the extent of having the inwardly sloping wall 14 slanted at a greater angle and the waist portion 36 reduced to less diameter so as to provide greater clearance for the heads of the birds over the trough. Also, the rim flange 11 is shown extended further downward and on a flare to more or less fit the inclination of the inwardly sloping side wall 37 of the pan. This upwardly convergent side wall construction enables the pan to accommodate more water and to have a more substantial footing on the floor. The close fitting engagement of the flange of the cover over the convergent wall of the pan excludes dust, holds the cover in place against overturning forces and at the same time the taper fit permits the cover being readily lifted for washing out the trough.

A simple, trouble-free form of float valve is illustrated in Figs. 5 and 6, embodying a gooseneck 38 projecting from the supply fitting 22 into the central portion of the pan within the hollow cover and terminating in a downwardly directed restricted nozzle 39 engageable by a resilient valve disc 40 carried by the vertically operable float 41. The latter is shown guided in its vertical movements by a tubular extension 42 riding over the downwardly directed vertical portion 43 of the gooseneck and the latter is shown detachably connected with the float by a bayonet joint 44 with the upstanding annular flange 45 on the top of the float.

The tube 42 and flange 45 with which it is connected constitute a tubular vertical guide for confining and directing the float over the downwardly directed neck portion 43 of the pipe. This tubular guide may have liquid escape passages or the incoming water may simply be permitted to flow up over the top of the tubular guide.

The valve disc 40 may have a removable fit in the bottom of the tubular guide so that it may be replaced when required. A number of discs may be inserted in the bottom of the guide to determine the level at which the float will close the water supply.

A screw connection may be employed in place of the bayonet joint 44, and in any event such construction enables the tubular guide 42 to be disconnected from the float and these elements then to be completely separated from the downwardly directed supply piping.

What is claimed is:

A continuously operative, automatic poultry fountain comprising a normally stationary floor pan having an upstanding wall for confining a body of supply water, pipe fittings secured to opposite sides of said wall near the bottom of the pan, the fitting at the outside of the wall having means for enabling connection of a water supply pipe therewith and the pipe fitting at the inside of the wall being in communication with said outer pipe fitting and projecting inwardly into the pan, a float lever pivoted at its outer end to said inner pipe fitting and having a float at its inner end disposed in the central portion of the pan, a valve controlling admission of water through said pipe fittings and including a movable valve element exposed at the inner end to operation by said float lever and a removable cover for said pan including a dome-shaped top portion, an inwardly convergent portion of reduced diameter below said dome-shaped top portion, an outwardly flaring portion below said portion of reduced diameter and an upwardly and outwardly flaring portion at the lower end of said first mentioned outwardly flaring portion and forming therewith a narrow, annular water trough carried by and forming an integral part of the cover beneath and shielded by the dome-shaped top portion of the cover, said trough being of less external diameter than the pan and shallow enough to be seated in the pan over the top of the inner pipe fitting and having a flange about the outer edge of the same for engagement over the upper edge of the confining wall of the pan to thereby detachably support the complete cover and trough on the pan free and clear of the float controlled water supply connections described, said cover having an opening in the trough forming portion of the same at approximately the liquid level desired to be maintained in the trough, providing free communication between the trough and contents of the pan, and said cover being free for lifting off the pan for cleaning purposes and for quick return to and replacement on the pan.

SEYMOUR M. LEVINE.

REFERENCES CITED

The following references are of record in the file of this patent:

UNITED STATES PATENTS

| Number | Name | Date |
| --- | --- | --- |
| 648,922 | Chace | May 8, 1900 |
| 717,042 | Smith | Dec. 30, 1902 |
| 969,852 | Enos, Jr. | Sept. 13, 1910 |
| 1,195,443 | Collis | Aug. 22, 1916 |
| 1,365,367 | Bettenga | Jan. 11, 1921 |
| 2,338,072 | Quinn | Dec. 28, 1943 |
| 2,387,664 | Kubista | Oct. 23, 1945 |